Patented Feb. 21, 1939

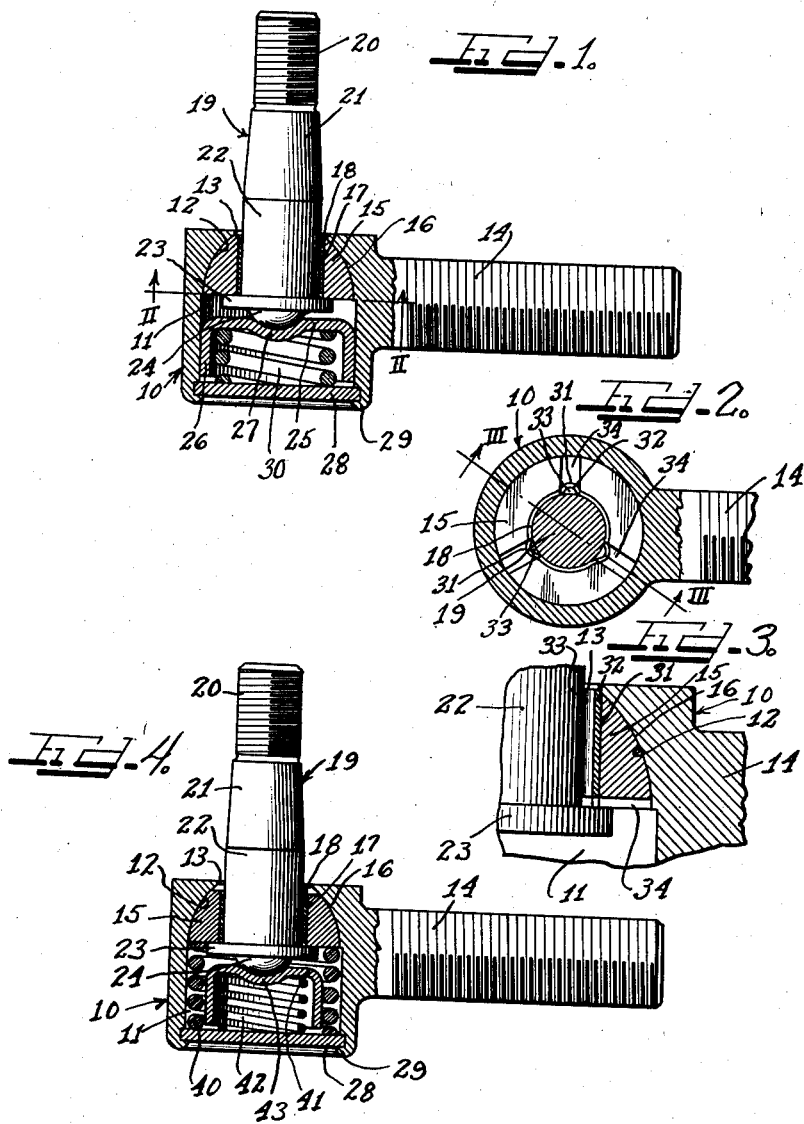

2,147,815

UNITED STATES PATENT OFFICE 2,147,815

JOINT HAVING CYLINDRICAL STUDS

George H. Hufferd and Matthew P. Graham, Detroit, Mich., assignors to Thompson Products Incorporated, Cleveland, Ohio, a corporation of Ohio Application March 20, 1936, Serial No. 69,857

4 Claims. (Cl. 287—90)

This invention relates to joint structures having separate pairs of bearing surfaces for tilting movement of the joint stud relative to its housing and for rotation of the stud about its own axis.

More specifically this invention relates to tie rod joints having cylindrical studs rotatable about their own axes in elements which are tiltable in the joint housing.

In the United States patent to George H. Hufferd No. 1,957,781, dated May 8, 1934, there is described and claimed joint structures having dual bearing surfaces converging in the same general direction to provide separate surfaces for tilting movement of the stud relative to its housing and for rotation of the stud about its own axis. We have now provided joint structures particularly adapted for tie rod joints wherein the stud members of the joints are merely provided with a cylindrical bearing surface instead of a more expensive converging bearing surface.

According to this invention a seating element having a cylindrical bore extending therethrough is tiltably mounted in a joint housing for receiving a stud therethrough with a cylindrical bearing surface in bearing relation to the seating element. The studs used in joints of this invention can therefore be prepared from a minimum amount of stock and since their bearing surfaces are cylindrical the studs can be machined more cheaply than heretofore.

The joints of this invention can readily be provided with lubricant grooves for supplying lubricant to the bearing surfaces thereof and furthermore can be equipped with separate spring members for the stud and for the seating element so that each of these members can be urged into bearing engagement with its cooperating member under separately regulated amounts of spring pressure.

It is then an object of this invention to provide dual bearing joints having cylindrical studs.

A further object of this invention is to provide joints using studs prepared from a minimum amount of material at low cost.

Another object of this invention is to provide tie rod joints having cylindrical studs extending through the cylindrical bores of seating elements which are tiltably mounted in joint housings.

Another object of this invention is to provide tie rod joints having seating elements tiltably mounted in joint housings and provided with cylindrical bushing sleeves for receiving cylindrical studs.

A further object of this invention is to provide seating elements for joints having outer segmental spherical bearing surfaces and cylindrical bores extending therethrough with cylindrical bushings seated therein in tight frictional engagement.

A specific object of this invention is to provide a seating element for a tie rod joint having a cylindrical bore therein with lubricant groove recesses in the bore and a bushing sleeve burnished into the bore to follow the contour thereof and provide lubricant grooves communicating with lubricant passageways formed in the bottom of the seating element.

Other and further objects of this invention will become apparent to those skilled in the art from the following detailed description of the annexed sheet of drawing which discloses preferred embodiments of the invention.

On the drawing:

Figure 1 is a side elevational view, with parts in vertical cross-section of a tie rod joint according to this invention.

Figure 2 is a fragmentary horizontal cross-sectional view, with a part shown in plan, taken substantially along the line II—II of Figure 1.

Figure 3 is an enlarged cross-sectional view, taken substantially along the line III—III of Figure 2.

Figure 4 is a side elevational view, with parts in vertical cross-section, of a modified form of tie rod joint according to this invention.

As shown on the drawing:

In Figure 1 the reference numeral 10 indicates a joint housing having a cylindrical bore 11 extending therethrough with an inturned segmental spherical bearing wall 12 formed at one end thereof to define a restricted opening 13 giving entrance to the housing. The housing 11 is equipped with an integral laterally extending shank 14 which is threaded for insertion into a tie rod end (not shown).

A seating element 15 is disposed in the bore 11 and has an outer segmental spherical bearing surface 16 in bearing engagement with the segmental spherical wall portion 12 of the bore 11.

The seating element 15 has a cylindrical bore 17 extending therethrough with a bushing sleeve 18 in tight frictional engagement therewith.

A stud 19 having a threaded top 20, a tapered intermediate portion 21, a cylindrical bearing portion 22, an annular collar 23 near the bottom thereof, and a rounded end 24 below the collar 23 is disposed through the sleeve 18 with the cylindrical bearing portion 22 thereof in bearing engagement with the sleeve and the collar 23 thereof in engagement with the bottom of the seating element 15.

A cap member 25 is disposed in the bore 11 beneath the stud 19 and has a depending skirt portion 26 slidable along the wall defining the bore 11. The cap member 25 is provided with a depressed center portion 27 for receiving the rounded end 24 of the stud 19.

The bottom of the housing 10 is closed by the disk 28 which is spun into the housing by turning the end of the housing over the disk around the periphery thereof as shown at 29.

A coiled spring 30 is held under compression between the disk 28 and the cap 25 for urging the cap upward in the housing in engagement with the rounded end 24 of the stud thereby maintaining the joint elements in operative position and automatically taking up any wear of the bearing surfaces of these elements.

As best shown in Figures 2 and 3 the seating element 15 is provided with recessed grooves 31 along its inner cylindrical wall. When the bushing or bearing sleeve 18 is burnished into the bore of the seating element 15 the metal of the sleeve is depressed into the grooves 31 of the sleeves as shown at 32 to form grease grooves 33 communicating with the cylindrical bearing surface 22 of the stud 19. In this manner a plurality of grease grooves 33 are provided around the bearing surface of the stud and the bushing sleeve 18 is firmly fixed in the seating element 15 against rotation. The burnishing of the sleeve into the bore of the seating element may be conveniently performed by a burnishing or reaming tool adapted to expand the metal of the sleeve into tight frictional engagement with the walls defining the bore through the seating element 15 and the grooves 31 communicating with the walls.

The bottom of the seating element 15 is then channeled as shown at 34 through the end of the sleeve 18 to communicate with the lubricant grooves 33. This channeling of the bottom of the seating element 15 and the end of the sleeve 18 insures the passing of lubricant from the interior of the housing and over the collar 23 and along the bearing surface 22 of the stud 19. Thus both the bearing surface 22 of the stud and the top of the collar 23 of the stud are lubricated so that said stud freely rotates in the seating element 15.

In the modified structure shown in Figure 4 parts similar to the parts described in Figures 1 to 3 have been marked with identical reference numerals.

In the structure shown in Figure 4, however, the seating element 15 is urged against the segmental spherical bearing surface 12 of the bore 11 by a separate coiled spring 40 compressed between the closure plate 28 and the bottom of the seating element 15 as shown. This spring surrounds the collar 23 of the stud and directly engages the bottom of the seating element to urge this element into proper bearing relation with the bearing wall of the housing.

A dished cap member 41 of smaller diameter than the cap member 25 described in Figure 1 is disposed in the housing 10 within the coiled spring 40 and is adapted to slide up and down freely within the coiled spring 40.

A smaller coiled spring 42 is disposed in the dished cap member 41 and held under compression between the closure plate 28 and the top of the cap member. The cap member 41 has a depressed central portion 43 for receiving the rounded end 24 of the stud and the coiled spring 42 urges this cap member against the rounded end of the stud with the desired force.

In the structure shown in Figure 4, therefore, separate spring members are provided for urging the seating member against its bearing surface and for urging the stud member into the seating member. This structure therefore provides a greater force urged against the seating element than is urged against the stud member whereby a displacement of the seating element is prevented without interfering with the free rotation of the stud in the seating element.

The studs used in the joints of this invention can be conveniently formed from cylindrical rods by extrusion and upsetting operations to provide the finished contour of the studs. Thus the rod metal can be extruded to provide the small cylindrical end for threading as at 20, the intermediate tapered portion 21 and the cylindrical bearing portion 22. The collar 23 and the rounded end 24 can then be formed on the end of the extruded member by upsetting operations. This method of manufacturing the tie rod studs greatly decreases their cost and only requires a minimum amount of stock.

We are aware that many changes may be made and numerous details of construction may be varied through a wide range without departing from the principles of this invention, and we, therefore, do not purpose limiting the patent granted hereon otherwise than necessitated by the prior art.

We claim:

1. A tie rod joint comprising a housing having a bore extending therethrough with an inturned segmental spherical wall at one end thereof defining a restricted opening to the housing, a seating element having an outer segmental spherical bearing surface in bearing engagement with the inturned wall of the housing and a cylindrical bore extending therethrough, a stud extending through said bore of the seating element having a cylindrical bearing portion freely rotatable therein, a collar on said stud seated against the bottom of the seating element, a coiled spring held under compression in said bore of the housing acting against the bottom of said seating element, a cap member slidable within the coiled spring, and a second spring urging said cap member against the end of the stud for holding the stud in proper position in the seating element.

2. A tie rod joint comprising a housing having a segmental spherical bearing surface therein, a seating element freely tiltable on said bearing surface having a cylindrical bore extending therethrough, a stud extending through said seating element having a cylindrical bearing portion freely rotatable therein, a collar on said stud seated against the bottom of said seating element, a rounded member on the end of said stud below said collar, a closure plate for said housing, a coiled spring in said housing held under compression between said closure plate and the bottom of said seating element for urging the seating element against the bearing surface of the housing, a dished cap member slidably mounted within said coiled spring having a central portion adapted to cooperate with the rounded end of the stud and a second coiled spring held under compression between the closure plate of the housing and the cap member for urging the cap member against the stud whereby separate spring means are provided to hold the seating element and the stud element in proper operative position in the housing.

3. A joint comprising a housing having an inner bearing surface, a seating element in said housing in bearing relation with the bearing surface thereof, a stud extending through said seating element in bearing engagement therewith, said stud having a rounded end portion, a coiled spring held under compression in said housing against the bottom of said seating element for urging the seating element into bearing cooperation with the housing, a retainer disposed within said coiled spring and adapted to receive the rounded end of the stud and a second coiled spring held under compression in the joint housing for urging the retainer against the rounded end of the stud to maintain the stud in bearing relation in the heating element whereby separate spring means are provided to hold the seating element and the stud element in proper operative position in the housing.

4. In a joint including a housing, a seating element in said housing having a bearing surface cooperating with the housing, a stud extending through said seating element having a bearing surface cooperating with the seating element, one of said bearing surfaces accommodating tilting movements of the stud relative to the housing, and the other of said bearing surfaces accommodating rotating movements of the stud about its own axis, and means carried by the stud for thrusting against said seating element to prevent the stud from being pulled through the seating element, the improvement which comprises a spring in the housing thrusting against the seating element and a second spring in the housing thrusting against the stud, whereby separate means urge the seating element into operative position in the housing and the stud into operative position in the seating element.

GEORGE H. HUFFERD.
MATTHEW P. GRAHAM.